Jan. 23, 1951 L. MATTEUCCI 2,538,973
LOCKING DEVICE FOR CALIPER OR WRENCH-LIKE GAUGES
Filed Oct. 22, 1949
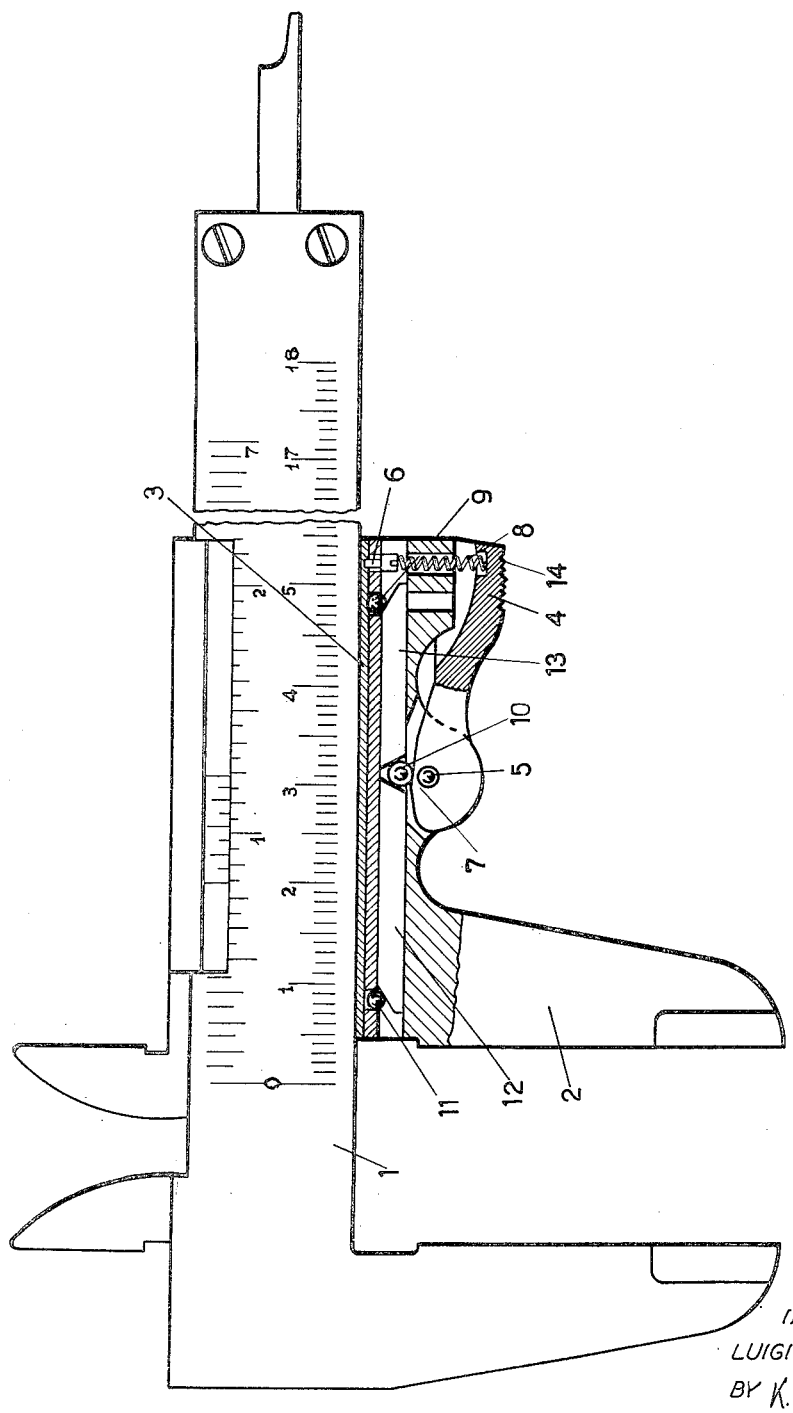
INVENTOR:
LUIGI MATTEUCCI
BY K. A. Mayr
ATTORNEY.

Patented Jan. 23, 1951

2,538,973

UNITED STATES PATENT OFFICE 2,538,973

LOCKING DEVICE FOR CALIPER OR WRENCHLIKE GAUGES

Luigi Matteucci, Milan, Italy, assignor to S. A. Officine Meccaniche F. lli Daldi & Matteucci, Milan, Italy Application October 22, 1949, Serial No. 122,890
In Italy October 26, 1948

4 Claims. (Cl. 33—143)

This invention relates to an improved device for automatically locking the slide of a calliper or wrench-like gauge.

In such gauges of conventional construction, locking of the slide is effected by means of a spring acting upon a cam which exerts a pressure against an elastic member thereby causing deformation of the said member, and thus, the locking of the slide.

However, in such conventional gauges, only one central point of pressure of the member against the scale of the gauge is obtained and the slide is not perfectly guided and is likely to oscillate, which impairs precision of measuring.

In the device according to the present invention, the cam which is actuated by a spring, does not act upon the member directly, but upon a system of wedges and rollers or balls or other intermediary members and, therefore, there is not one single point of pressure, but two or more such points and, therefore, the accuracy of measuring attained is greater and the locking force may also be increased.

One embodiment of the invention is shown in the accompanying drawing which shows a calliper or wrench-like gauge partly in section so as to clearly show the slide-locking mechanism.

The gauge comprises a scale or rule member 1 and a slide element 2. The slide is slidable along the scale 1 and is locked by a gib 3, which is held in its right place by a stop screw 6. The slide-locking mechanism comprises a lever 4 pivotally mounted on a pin 5 and carrying a cam 7, a spring 8, three balls 9, 10 and 11, and two wedges 12 and 13.

The operation of the locking device is as follows:

Owing to the pressure exerted by the spring 8 on the lever 4, the cam 7 at one end of the lever presses against the ball 10.

The ball 10 pushes the wedges or actuating members 12 and 13 apart by acting upon their neighboring inclined ends so that the inclined planes at their other ends will press the two balls or presser members 9 and 11 against the locking gib 3 and thus the member 3 against the scale 1.

From what has been described it will be understood that if the lever 4 is left alone, the whole slide of the gauge will be locked against the scale 1 by the action of spring 8; whilst the scale 1 becomes free only if pressure is exerted upon portion 14 of lever 4 overcoming the action of spring 8. In this case the cam 7 no longer exerts a pressure upon the ball 10 and, therefore, no pressure is exerted on the balls 9 and 11.

Having now particularly described and ascertained the nature of my invention and in what manner the same is to be performed, I declare that what I claim is:

1. A slide caliper having a rule member, a slide element adapted to slide on said rule member, said element comprising a longitudinal locking gib having a longitudinal face sliding on said rule member and having a longitudinal back, spaced presser members abutting said back, two longitudinally aligned longitudinal actuating members longitudinally slidably mounted in said element and substantially parallel to said locking gib and betwen said presser members, and spring actuated means engaging said actuating members and adapted to force same apart and toward said presser members, each actuating member having an end portion engaging one of said presser members and being adapted to press the presser member against said locking gib for pressing the latter against said rule member upon longitudinal movement of the actuating members toward the presser members.

2. A slide caliper as defined in claim 1, the end portions of said actuating members engaging said presser members being in the shape of wedges.

3. A slide caliper as defined in claim 2, said presser members being balls.

4. A slide caliper as defined in claim 2, said presser members being balls, said actuating members having wedge-shaped end portions facing one another, and said spring actuated means comprising a ball inserted betwen the wedge-shaped end portions of said actuating members and comprising a lever member having a cam portion engaging said ball and forcing the latter in between the actuating members.

LUIGI MATTEUCCI.

REFERENCES CITED

The following references are of record in the file of this patent:

UNITED STATES PATENTS

| Number | Name | Date |
|---|---|---|
| 474,111 | Bauer | May 3, 1892 |
| 1,641,266 | Giles | Sept. 6, 1927 |
| 1,823,045 | Hommel | Sept. 15, 1931 |

FOREIGN PATENTS

| Number | Country | Date |
|---|---|---|
| 39,855 | Germany | June 20, 1887 |
| 113,281 | Great Britain | June 13, 1918 |